(12) United States Patent
Hasegawa (10) Patent No.: US 6,568,228 B2
(45) Date of Patent: May 27, 2003

(54) SHIFT LEVER DEVICE (75) Inventor: Hiroyasu Hasegawa, Niwa-gun (JP)

(73) Assignee: Kabushiki Kaisha Tokai-Rika-Denki-Seishakusho, Aichi-ken (JP)

(*) Notice: Subject to any disclaimer, the term of this patent is extended or adjusted under 35 U.S.C. 154(b) by 0 days.

(21) Appl. No.: 09/942,860

(22) Filed: Aug. 31, 2001

(65) Prior Publication Data
US 2002/0033033 A1 Mar. 21, 2002

(30) Foreign Application Priority Data
Sep. 18, 2000 (JP) .................................. 2000-282534

(51) Int. Cl.[7] .......................... B60R 25/06; E05B 65/12
(52) U.S. Cl. ................................... 70/247; 70/245
(58) Field of Search ........................ 70/245, 246, 247, 70/248, 252; 477/99; 74/483 R, 473 R (56) References Cited

U.S. PATENT DOCUMENTS

| | | | |
|---|---|---|---|
| 5,078,242 A | * 1/1992 | Ratke et al. ............. | 192/220.4 |
| 5,309,744 A | * 5/1994 | Kito et al. ............... | 192/219.6 |
| 5,647,818 A | * 7/1997 | Moody ..................... | 192/222 |
| 6,176,809 B1 | * 1/2001 | Visser et al. ............. | 477/96 |
| 6,338,288 B1 | * 1/2002 | Spadaccini et al. ........ | 70/247 |
| 6,345,521 B1 | * 2/2002 | Suzuki ..................... | 70/247 |

* cited by examiner

Primary Examiner—Anthony Knight
Assistant Examiner—Michael J. Kyle
(74) Attorney, Agent, or Firm—Nixon Peabody LLP; Thomas W. Cole (57) ABSTRACT

In a shift lever device of the present invention, when a lever is positioned at a "P" shift position and an ignition key is positioned at a "LOCK" position, a lock bar impedes swivel of a lock plate, and the lever cannot be shifted. If the lever is not positioned at the "P" shift position, the lock bar retains rotation of a cam, and the ignition key cannot be moved to the "LOCK" position. By forming a lock body integrally with the shift lever device, a shift lock mechanism can be used as an anti-theft device. Further, a key interlock mechanism serving as a safety device of the shift lever device can be provided easily.

19 Claims, 5 Drawing Sheets

FRONT OF VEHICLE          REAR OF VEHICLE

SHIFT LEVER DEVICE

BACKGROUND OF THE INVENTION

1. Field of the Invention

The present invention relates to a shift lever device for shifting a transmission of a vehicle.

2. Description of the Related Art

A general vehicle is provided with, for example, a so-called steering lock mechanism as an anti-theft device. In the steering lock mechanism, for example, a steering wheel is fixed to a steering shaft, the steering shaft is accommodated within a steering post, and a mating concave portion is formed in the steering shaft. Further, a lock body is assembled with the steering post, and is disposed in a vicinity of the steering post. A key cylinder, into which an ignition key is inserted, is accommodated in the lock body. A lock bar is provided between the key cylinder and the steering shaft. In this steering lock mechanism, when the ignition key is rotated to a "LOCK" position, the lock bar mates to the mating concave portion of the steering shaft. In this way, rotation of the steering wheel is impeded.

Further, a shift lever device of a transmission is provided within the vehicle passenger compartment in the vehicle. A key interlock mechanism is provided as a safety device. The key interlock mechanism is structured such that, if the lever is not positioned at a specified shift position (e.g., the "P" shift position), the ignition key cannot be pulled out from the key cylinder (the ignition key cannot be rotated to the "LOCK" position).

However, in a vehicle such as that described above, because the steering lock mechanism is provided as an anti-theft device, the mating concave portion of the steering shaft and the lock bar and the like are needed. Thus, problems arise in that the steering post and the steering shaft become complex mechanisms, and the weight and cost thereof increase.

Further, the shift lever device and the lock body are provided at positions which are separated from one another. Thus, in order to provide the key interlock mechanism which is the safety device of the shift lever device, rotation of the ignition key must be impeded electrically by a solenoid or the like, or rotation of the ignition key must be impeded mechanically by a cable or the like. Thus, a problem arises in that setting of the key interlock mechanism is troublesome.

SUMMARY OF THE INVENTION

In view of the aforementioned, an object of the present invention is to provide a shift lever device in which a steering post and a steering shaft are made simpler, lighter-weight and lower cost, and to provide a shift lever device in which setting of a key interlock mechanism is easy.

A first aspect of the present invention is a shift lever device which is provided within a vehicle passenger compartment and which is formed integrally with a lock body which accommodates a key cylinder into which an ignition key is inserted, the shift lever device comprising: (a) a lever which is provided within the vehicle passenger compartment so as to be freely swiveled for shifting a transmission; (b) a lock plate which swivels as the lever is operated for shifting; (c) a cam which is provided at the key cylinder, and which rotates integrally with rotation of the ignition key, and which opposes the lock plate when the ignition key is positioned at a lock position; and (d) a lock bar which is provided between the cam and the lock plate, and which, in a state in which the lever is positioned at a specified shift position, is moved by the cam toward the lock plate and enabled to impede swivel of the lock plate, and, in a state in which the lever is not positioned at the specified shift position, is impeded by the lock plate from being moved toward the lock plate by the cam and is enabled to retain rotation of the cam.

The above-described shift lever device is formed integrally with the lock body provided within the vehicle passenger compartment. The key cylinder, into which the ignition key is inserted, is accommodated in the lock body.

The lock plate swivels as the lever is shifted. The cam provided at the key cylinder rotates integrally with the rotation of the ignition key, and opposes the lock plate when the ignition key is positioned at the "LOCK" position. Further, the lock bar is provided between the cam and the lock plate.

The shift lever device is provided with the shift lock mechanism. When the ignition key is rotated to the "LOCK" position in a state in which the lever is positioned at a specified shift position, the lock bar is moved toward the lock plate by the cam. In this way, swivel of the lock plate is impeded by the lock bar, and thus the lever cannot be shifted from the specified shift position.

On the other hand, in a state in which the lever is positioned at the specified shift position, if the ignition key is rotated to a position other than the "LOCK" position, the lock bar is moved toward the cam as the cam rotates. In this way, the swivel of the lock plate is not impeded by the lock bar, and thus the lever can be shifted from the specified shift position.

Accordingly, in accordance with the shift lock mechanism, the lever cannot be shifted from the specified shift position unless the ignition key is rotated to a position other than the "LOCK" position. Thus, the shift lock mechanism can be used as an anti-theft device.

The shift lever device is provided with the key interlock mechanism. In a state in which the lever is not positioned at a specified shift position, even if an attempt is made to rotate the ignition key to the "LOCK" position, movement by the cam of the lock bar toward the lock plate is impeded by the lock plate. In this way, the lock bar retains the rotation of the cam, and the ignition key cannot be rotated to the "LOCK" position. As a result, the ignition key cannot be pulled out from the key cylinder.

On the other hand, when the lever is shifted to the specified shift position, the movement by the cam of the lock bar toward the lock plate is not impeded by the lock plate. In this way, the retention of the rotation of the cam by the lock bar is cancelled, the ignition key can be rotated to the "LOCK" position, and the ignition key can be pulled out from the key cylinder.

Accordingly, in accordance with the key interlock mechanism, the ignition key cannot be pulled out from the key cylinder if the lever is not positioned at the specified shift position.

In this way, by forming the lock body integrally with the shift lever device, the shift lock mechanism is used as an anti-theft device, and the conventional steering lock mechanism can be done away with. According to the present invention, the steering post and the steering shaft can thereby be made simpler, lighter-weight, and lower cost.

Moreover, by forming the lock body integrally with the shift lever device, the conventional solenoid, cable, and the like are no longer needed, and the key interlock mechanism can be provided easily.

A second aspect of the present invention is a shift lever device which is provided within a vehicle passenger compartment and which is formed integrally with a starting operation portion which starts an engine by a predetermined operation being carried out in a state in which a key member provided in a vehicle is disposed within the vehicle passenger compartment, the shift lever device comprising: a lever which is provided within the vehicle passenger compartment so as to be freely swiveled for shifting a transmission; and a shift lock mechanism which does not permit shifting operation of the lever from a specified shift position unless at least the key member is disposed within the vehicle passenger compartment.

This shift lever device is formed integrally with the starting operation portion provided within the vehicle passenger compartment. In a state in which a key member provided in a vehicle is disposed within the vehicle passenger compartment, by carrying out a predetermined operation with respect to the starting operation portion, the engine is started.

The shift lever device is provided with a shift lock mechanism. The lever cannot be shifted from the specified shift position unless at least the key member is disposed within the vehicle passenger compartment. Thus, the shift lock mechanism can be used as an anti-theft device.

Here, by forming the starting operation portion integrally with the shift lever device, the shift lock mechanism is used as an anti-theft device, and the conventional steering lock mechanism can be done away with. In this way, the steering post and the steering shaft can be made simpler, lighter-weight, and lower cost.

A third aspect of the present invention is a shift lever device which is provided within a vehicle passenger compartment and which is formed integrally with a lock body which accommodates a key cylinder into which an ignition key is inserted, the shift lever device comprising: a lever which is provided within the vehicle passenger compartment so as to be freely swiveled for shifting a transmission; and a key interlock mechanism which does not permit the ignition key to be pulled out from the key cylinder unless the lever is positioned at a specified shift position.

The shift lever device is formed integrally with the lock body provided within the vehicle passenger compartment. The key cylinder, into which the ignition key is inserted, is accommodated in the lock body.

The shift lever device is provided with a key interlock mechanism. The ignition key cannot be pulled out from the key cylinder if the lever is not positioned at a specified shift position.

Here, by forming the lock body integrally with the shift lever device, the conventional solenoid, cable, and the like are no longer needed, and the key interlock mechanism can be provided easily.

DESCRIPTION OF THE PREFERRED EMBODIMENTS

Figure 1:
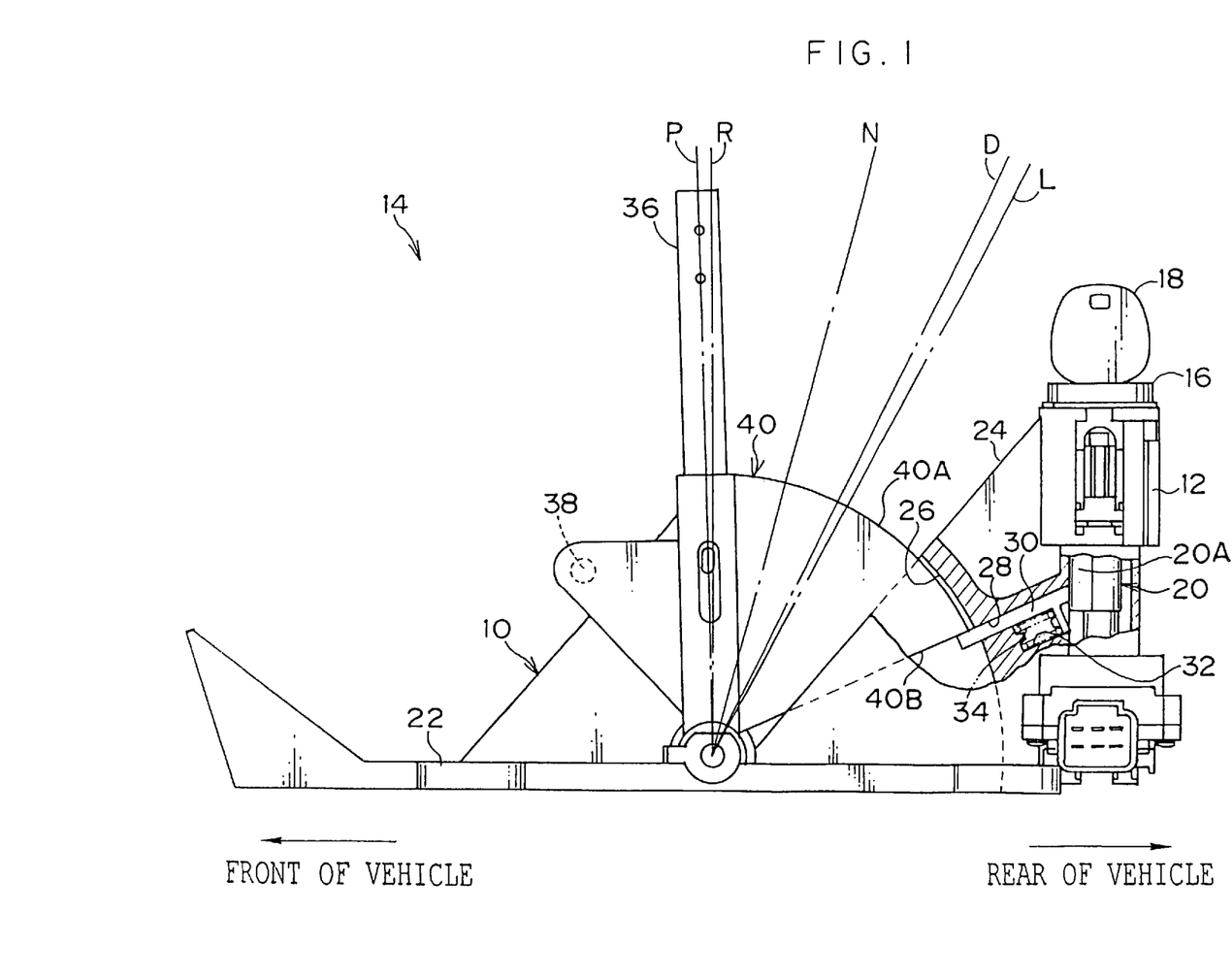
FIG. 1 is a partially cutaway side view showing an integral part in which a shift lever device relating to an embodiment of the present invention is integral with a lock body.
Figure 2:
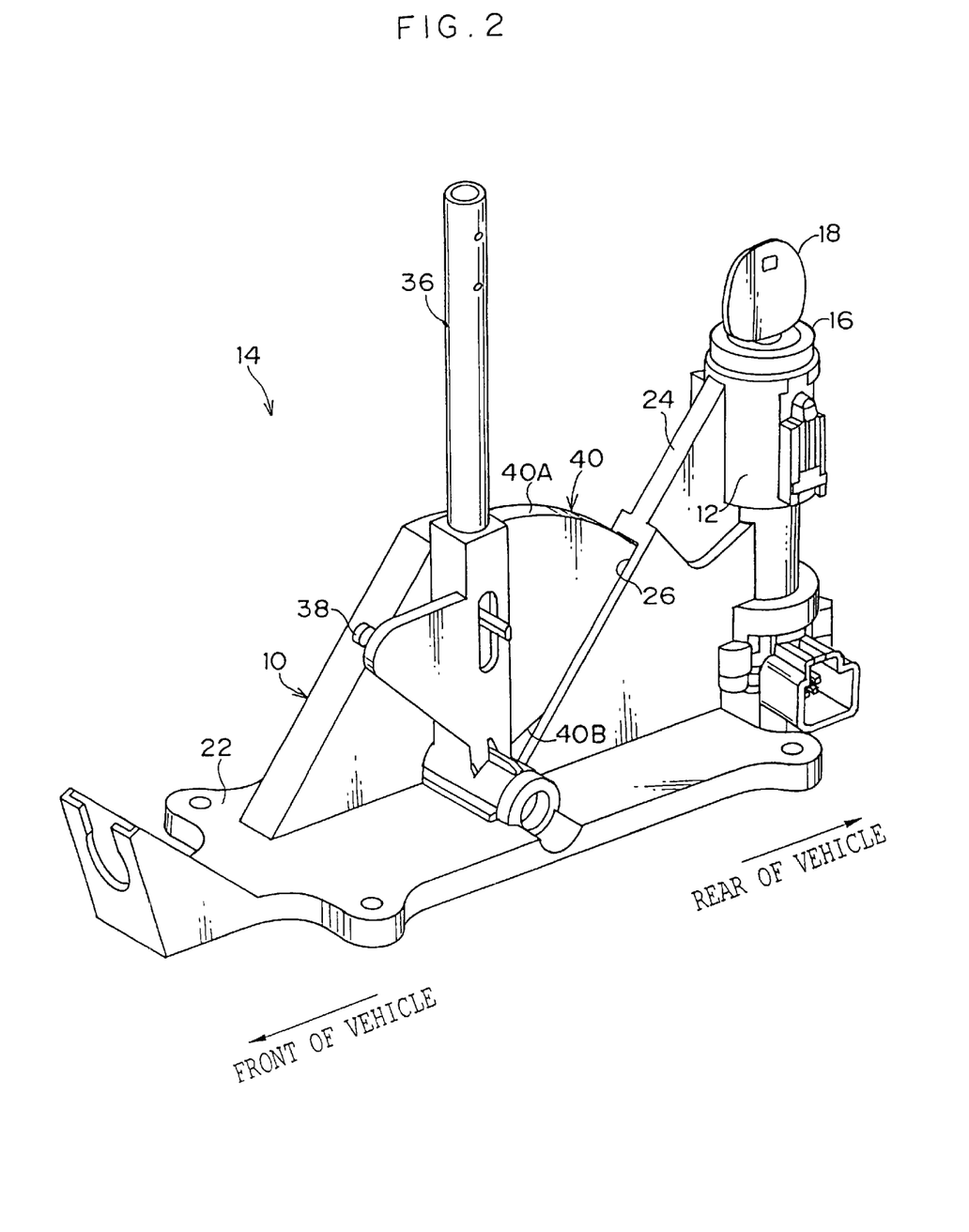
FIG. 2 is a perspective view showing the integral part in which the shift lever device relating to the embodiment of the present invention is integral with the lock body.

In FIG. 1, an integral part 14, in which a shift lever device 10 relating to an embodiment of the present invention is formed integrally with a lock body 12 forming a starting operation portion, is illustrated in a partially cutaway side view. In FIG. 2, the integral part 14 is illustrated in a perspective view.

The shift lever device 10 relating to the present embodiment is integrated with the lock body 12 so as to form the integral part 14. The lock body 12 is formed in a substantially hollow cylindrical shape, and is provided at the floor portion (not illustrated) within a vehicle passenger compartment. A key cylinder 16, which forms a starting operation portion, is accommodated within the lock body 12. An ignition key 18, which serves as a key member, is inserted into the key cylinder 16.

Figure 5:
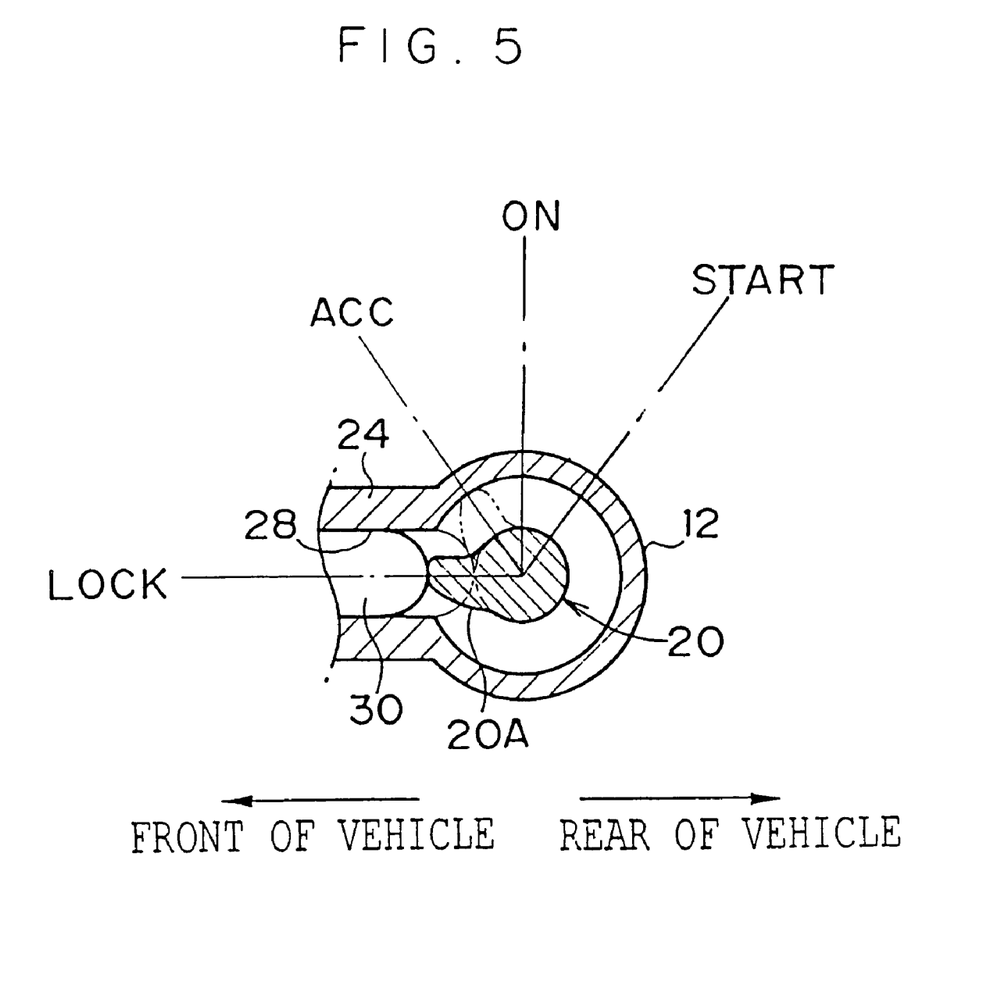
FIG. 5 is a cross-sectional view showing a relationship between a rotational position of a cam and a slid position of a lock bar.

A cam 20 having a projecting portion 20A is fixed to the lower portion of the key cylinder 16. When the ignition key 18 is rotated, the cam 20 rotates integrally with the key cylinder 16. Further, as shown in FIG. 5, when the ignition key 18 is positioned at a "LOCK" position, the projecting portion 20A of the cam 20 is disposed so as to face toward the front of the vehicle, i.e., so as to oppose a lock plate 40 which will be described later.

A shift lever main body 22 is provided at a vehicle front side of the lock body 12. The shift lever main body 22 is fixed to the floor portion within the vehicle passenger compartment. A connecting portion 24, which is triangular as viewed from the side, is provided upright at a vehicle rear side of the shift lever main body 22. The connecting portion 24 is connected to the lock body 12. The connecting portion 24 relating to an embodiment of the present invention functions as a cover member which covers the cam 20 and the projecting portion 20A and also a lock bar 30 and a lock plate 40 which will be described later.

An insertion hole 26, which is fan-shaped as viewed from the side, is formed in the connecting portion 24. The vehicle front side surface of the insertion hole 26 is opened. A quadrangular-column-shaped holding hole 28 is formed in the connecting portion 24. The holding hole 28 is allowed to communicate the insertion hole 26 with the portion, at which the cam 20 is disposed, within the lockbody 12. A lockbar 30 is movably held within the holding hole 28. Moreover, in the present embodiment, the lock bar 30 slides and moves in the holding hole 28. An accommodating hole 32 is formed integrally with the holding hole 28 at the lower side of the holding hole 28. A compression coil spring 34, which serves as a pressing member which presses the lock bar 30 toward the cam 20, is accommodated in the accommodating hole 32.

The lock bar 30 is urged toward the cam 20 by the compression coil spring 34, and always contacts the cam 20. In the present embodiment, the compression coil spring 34 is used as the pressing member. However, the present invention is not limited to use of the compression coil spring 34, and any member which applies urging force such that the lock bar 30 can always contact the cam 20 suffices. When the ignition key 18 is rotated to the "LOCK" position, the lock bar 30 is slid toward the insertion hole 26 (toward the side opposite the cam 20) by the projecting portion 20A of the cam 20, and projects into the insertion hole 26. On the other hand, when the ignition key 18 is rotated to a position other than the "LOCK" position, as the cam 20 rotates, the lock bar 30 is slid toward the cam 20 by the urging force of the compression coil spring 34. In this way, the projecting of the lock bar 30 into the insertion hole 26 is cancelled, and the lock bar 30 projects into the lock body 12.

The proximal end side of a lever 36 is supported, so as to be freely swiveled, at a central portion in the vehicle longitudinal direction of the shift lever main body 22. An engagement pin 38 is provided integrally in a vicinity of the proximal end of the lever 36, and the engagement pin 38 and the lever 36 swivel integrally. The engagement pin 38 is connected to an automatic transmission (not shown) by a cable (not shown) In this way, when a shifting operation is carried out by the lever 36 being swung in the longitudinal direction of the vehicle, the engagement pin 38 swivels integrally with the lever 36, and the automatic transmission is shifted via the cable.

Figure 3:
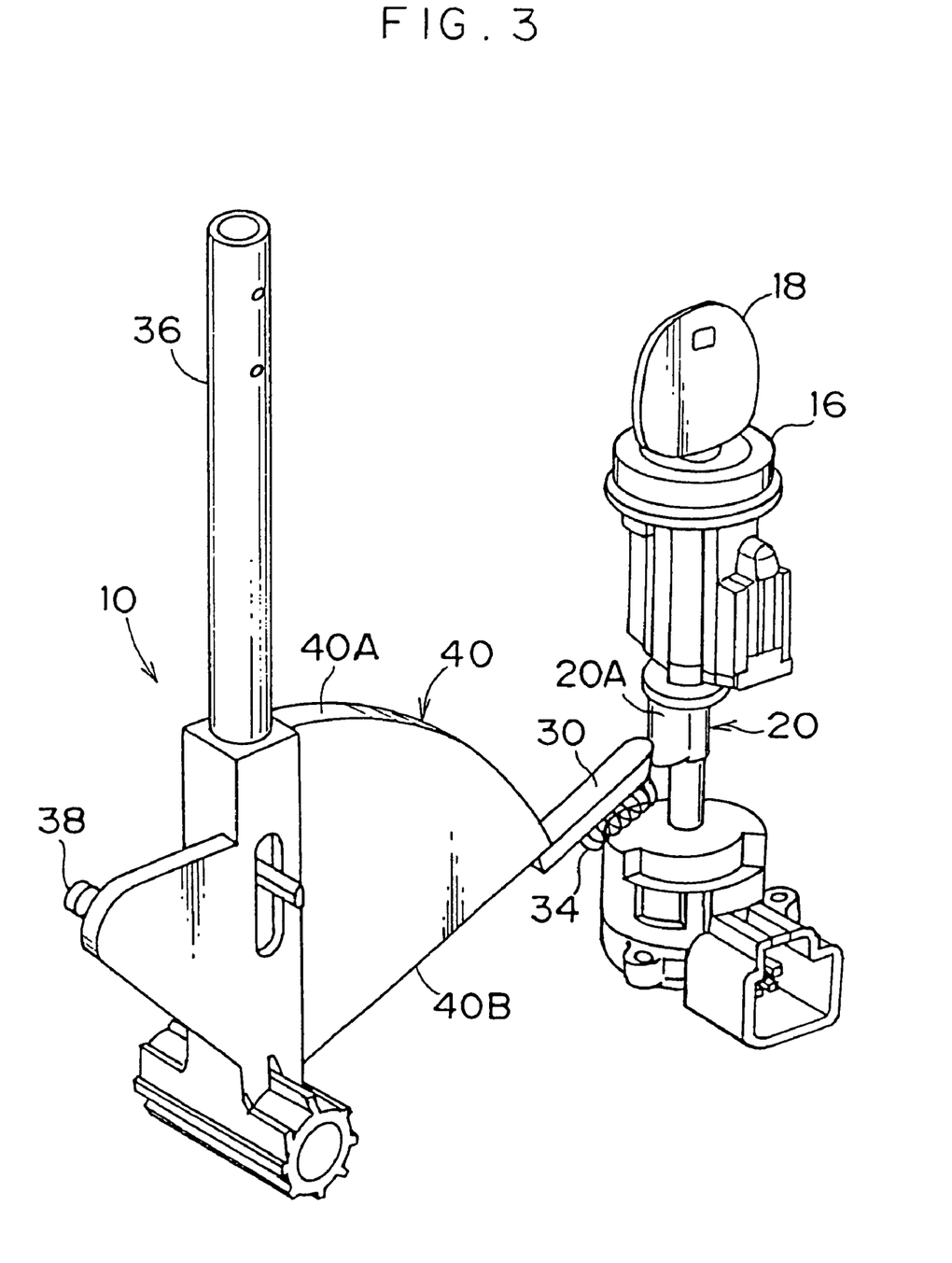
FIG. 3 is a perspective view showing a state in which a lever is positioned at a "P" shift position and an ignition key is positioned at a "LOCK" position.
Figure 4:
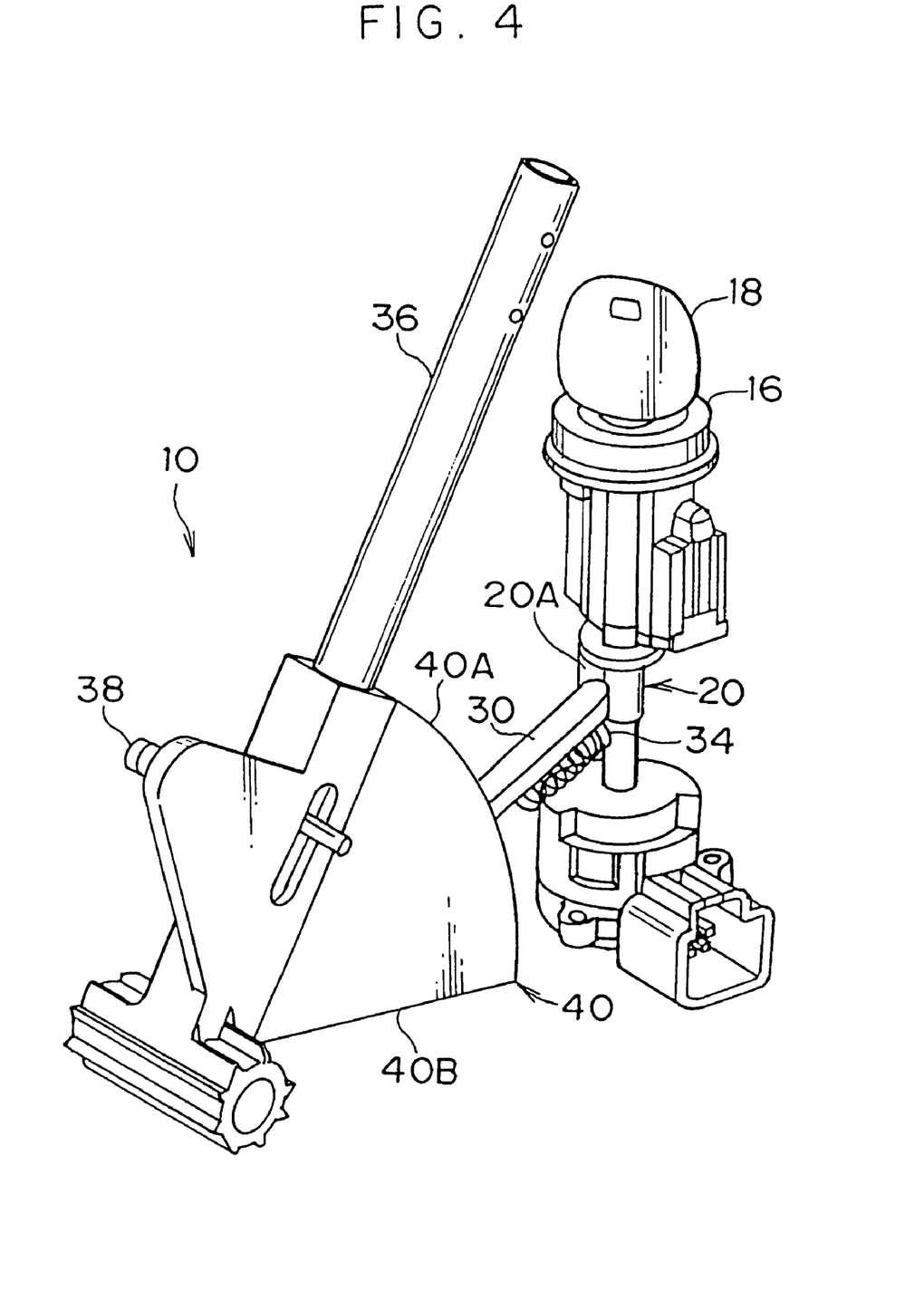
FIG. 4 is a perspective view showing a state in which the lever is positioned at a position other than the "P" shift position and the ignition key is positioned at a position (an "ACC" position) other than the "LOCK" position.

The lock plate 40 is integrally fixed at the proximal end side and the vehicle rear side of the lever 36. The lock plate 40 swivels as the lever 36 is shifted. The lock plate 40 is formed, as seen from the side, in a fan shape which corresponds to the insertion hole 26, and can move within the insertion hole 26 as the lever 36 is shifted. Further, the lock plate 40 has, at the upper portion thereof, an upper surface 40A which is arc-shaped as seen in side view, and has, at the vehicle rear side thereof, a side surface 40B which is planar. As shown in FIG. 3, in a state in which the lever 36 is shifted to the "P" shift position, the side surface 40B of the lock plate 40 is positioned on substantially the same plane as the upper surface of the lock bar 30. In this way, when the cam 20 rotates and the lock bar 30 projects into the insertion hole 26 due to the projecting portion 20A, the lock bar 30 can be inserted directly beneath the side surface 40B of the lock plate 40. On the other hand, as shown in FIG. 4, when the lever 36 is shifted to a shift position other than "P", the upper surface 40A of the lock plate 40 opposes the lock bar 30, and the sliding of the lock bar 30 toward the lock plate 40 by the projecting portion 20A of the cam 20 can be impeded.

Next, operation of the present embodiment will be described.

The shift lever device 10 having the above-described structure is formed integrally with the lock body 12 provided within the vehicle passenger compartment. The key cylinder 16, into which the ignition key 18 is inserted, is accommodated in the lock body 12.

The cam 20 provided at the key cylinder 16 rotates integrally with the rotation of the ignition key 18. When the ignition key 18 is positioned at the "LOCK" position, the projecting portion 20A of the cam 20 opposes the lock plate 40 which is fixed to the proximal end side of the lever 36 and which swivels as the lever 36 is shifted. The lock bar 30, which is provided between the cam 20 and the lock plate 40, is in a state of being urged toward the cam 20 by the compression coil spring 34.

A shift lock mechanism is provided at the shift lever device 10. As shown in FIGS. 1, 3 and 5, when the ignition key 18 is rotated to the "LOCK" position in the state in which the lever 36 is positioned at the "P" shift position, the lockbar 30 is slid toward the lock plate 40 by the projecting portion 20A of the cam 20. In this way, the lock bar 30 engages with the lock plate 40, i.e., the lock bar 30 is inserted directly beneath the side surface 40B of the lock plate 40. Swivel of the lock plate 40 is impeded, and the lever 36 cannot be shifted from the "P" shift position.

On the other hand, in a state in which the lever 36 is positioned at the "P" shift position, when the ignition key 18 is rotated to a position other than the "LOCK" position, as the cam 20 rotates, the lock bar 30 is slid toward the cam 20 by the urging force of the compression coil spring 34. In this way, the engagement of the lock bar 30 with the lock plate 40 is cancelled, and swivel of the lock plate 40 is not impeded by the lock bar 30. Thus, the lever 36 can be shifted from the "P" shift position.

Accordingly, in accordance with the shift lock mechanism, if the ignition key 18 is not rotated to a position other than the "LOCK" position, the lever 36 cannot be shifted from the "P" shift position. Thus, the shift lock mechanism can be used as an anti-theft device.

Further, the shift lever device 10 is provided with a key interlock mechanism. As shown in FIGS. 4 and 5, in the state in which the lever 36 is not positioned at the "P" shift position, even if an attempt is made to rotate the ignition key 18 to the "LOCK" position, the lock bar 30 abuts the upper surface 40A of the lock plate 40. The state of the lock bar 30 projecting toward the cam 20 is thereby maintained. Thus, sliding of the lock bar 30 toward the lock plate 40 by the projecting portion 20A of the cam 20 is impeded. In this way, the lockbar 30 retains the rotation of the cam 20, and the ignition key 18 cannot be rotated to the "LOCK" position. As a result, the ignition key 18 cannot be pulled out from the key cylinder 16.

On the other hand, when the lever 36 is shifted to the "P" shift position, the lock bar 30 can be inserted directly beneath the side surface 40B of the lock plate 40. Thus, sliding of the lock bar 30 toward the lock plate 40 by the projecting portion 20A of the cam 20 is not impeded by the lock plate 40. In this way, the retention of the rotation of the cam 20 by the lock bar 30 is released, the ignition key 18 can be rotated to the "LOCK" position, and the ignition key 18 can be pulled out from the key cylinder 16.

Accordingly, in accordance with the key interlock mechanism, if the lever 36 is not positioned at the "P" shift position, the ignition key 18 cannot be pulled out from the key cylinder 16.

In this way, by making the lock body 12 integral with the shift lever device 10, the shift lock mechanism is used as an anti-theft device, and the conventional steering lock mechanism can be done away with. Thus, the steering post and the steering shaft can be made simpler, lighter-weight, and lower cost.

Further, by making the lock body 12 integral with the shift lever device 10, the conventional solenoid, cable, and the like are no longer needed, and the key interlock mechanism can be provided easily.

In the present embodiment, the lock bar 30 is urged by the compression coil spring 34 toward the cam 20 so as to always contact the cam 20. Thus, when the ignition key 18 is rotated to the "LOCK" position at a time when the lever 36 is positioned at the "P" shift position, the lock bar 30 is slid toward the lock plate 40 by the projecting portion 20A of the cam 20. Hence, the lock bar 30 is inserted directly beneath the side surface 40B of the lock plate 40. Swivel of the lock plate 40 is impeded, and the lever 36 cannot be shifted from the "P" shift position. This is the structure of the shift lock mechanism of the present embodiment.

However, the shift lock mechanism may be constructed with the lock plate 40 extending downwardly in a fan-shape and a concave portion provided in the upper surface 40A at this extended section of the lock plate 40. Thus, the swivel of the lock plate 40 is impeded by inserting the lock bar 30 into the concave portion. Further, urging force from a pressing member does not need to be applied to the lock bar 30.

In this construction, when the ignition key 18 is rotated to the "LOCK" position in the state in which the lever 36 is positioned at the "P" position, the lock bar 30 is moved toward the lock plate 40 by the projecting portion 20A of the cam 20. Hence, the lock bar 30 is in a state of being inserted into the concave portion of the lock plate 40. The lock bar 30 interferes with the projecting portion 20A of the cam 20, and becomes unmovable. As a result, swivel of the lock plate 40 is impeded and the lever 36 cannot be shifted from the "P" shift position.

On the other hand, when the ignition key 18 is rotated to a position other than the "LOCK" position when the lever 36 is in the state of being positioned at the "P" shift position, the projecting portion 20A of the cam 20 rotates and the interference of the lock bar 30 and the projecting portion 20A is canceled. Thus, the lock bar 30 becomes movable. When the lever 36 is shifted from the "P" shift position, in the state in which the interference of the lock bar 30 and the projecting portion 20A is canceled, the lock plate 40 swivels integrally with the lever 36. The upper surface of the concave portion of the lock plate 40 is slanted. Therefore, the lock bar 30 is moved toward the cam 20 by following the contour of the upper surface of the concave portion of the lock plate 40. Thus, swivel of the lock plate 40 is not impeded by the lock bar 30, and the lever 36 can be shifted from the "P" shift position. Furthermore, the shape of the concave portion provided in the upper surface 40A of the lock plate 40 may be formed in any shape, such as a trapezoid or a V-shape, as long as the lock bar 30 can be pushed out toward the cam 20 from the concave portion when the lock plate 40 swivels as the lever 36 is shifted from the "P" shift position.

Further, in the present embodiment, the key cylinder 16 is accommodated in the lock body 12 so as to form the starting operation portion, and the ignition key 18 serves as the key member. However, the starting operation portion may be formed by providing, at the lock body, an operation member which can be pressed or rotated, and a so-called electronic card key can be used as the key member. In this case, for example, in a state in which the electronic card key is disposed in the vehicle passenger compartment and a receiving portion provided at the vehicle receives an ID code (predetermined information) transmitted from the electronic card key and the lever is positioned at the "P" shift position, the lever cannot be shifted from the "P" shift position unless the operation member is pressed or rotated such that the engine is started and a brake which brakes the vehicle is operated.

Furthermore, in the present embodiment, the shift lever device 10 and the lock body 12 (the integral part 14) are provided at the floor portion within the vehicle passenger compartment. However, the shift lever device and the lock body (the integral part) may be disposed at another region within the vehicle passenger compartment (e.g., at the instrument panel within the vehicle passenger compartment).

In the shift lock mechanism of the present embodiment, if the ignition key 18 is not rotated to a position other than the "LOCK" position, the lever 36 cannot be shifted from the "P" shift position. However, the shift lock mechanism may be structured such that the lever cannot be shifted from a specified shift position (e.g., the "N" shift position) if the ignition key is not rotated to a position other than the "LOCK" position.

Moreover, in the key interlock mechanism of the present embodiment, the ignition key 18 cannot be pulled out from the key cylinder 16 if the lever 36 is not positioned at the "P" shift position. However, the key interlock mechanism may be structured such that the ignition key cannot be pulled out from the key cylinder if the lever is not positioned at a specified shift position (e.g., the "N" shift position).

In the shift lever device of the present invention, by forming the lock body integrally with the shift lever device, the shift lock mechanism is used as an anti-theft device, and the conventional steering lock mechanism can be done away with. In this way, the steering post and the steering shaft can be made simpler, lighter-weight, and lower cost. Further, by forming the lock body integrally with the shift lever device, there is no need for a conventional solenoid or cable or the like, and the key interlock mechanism can be provided easily.

Moreover, by forming the starting operation portion integrally with the shift lever device, the shift lock mechanism is used as an anti-theft device, and the conventional steering lock mechanism can be done away with. In this way, the steering post and the steering shaft can be made simpler, lighter-weight, and lower cost.

By forming the lock body integrally with the shift lever device, there is no need for the conventional solenoid or cable or the like, and the key interlock mechanism can be provided easily.

What is claimed is:

1. A shift lever device which is provided within a vehicle passenger compartment and which is formed integrally with a lock body which accommodates a key cylinder into which an ignition key is inserted, the shift lever device comprising:
    (a) a lever which is provided within the vehicle passenger compartment so as to be freely swiveled for shifting a transmission;
    (b) a lock plate which swivels as the lever is operated for shifting;
    (c) a cam which is provided at the key cylinder, and which rotates integrally with rotation of the ignition key, and which opposes the lock plate when the ignition key is positioned at a lock position; and
    (d) a lock bar which is provided between the cam and the lock plate, and which, in a state in which the lever is positioned at a specified shift position, is moved by the cam toward the lock plate and enabled to impede swivel of the lock plate, and, in a state in which the lever is not positioned at the specified shift position, is impeded by the lock plate from being moved toward the lock plate by the cam and is enabled to retain rotation of the cam.

2. The shift lever device according to claim 1, wherein the lock plate is fixed at a proximal end side of the lever.

3. The shift lever device according to claim 1, wherein the lock plate is fan-shaped and swivels in a circumferential direction of the fan-shape by swiveling together with the lever to always impede the movement of the lock bar in the state in which the lever is not positioned at the specified shift position.

4. The shift lever device according to claim 1, further comprising a cover member which covers an engagement region of the cam, the lock bar and the lock plate.

5. The shift lever device according to claim 1, wherein, in the state in which the lever is positioned at the specified shift position, due to the cam rotating, the lock bar slides toward the lock plate, and due to a side surface of the lock plate being disposed in substantially the same plane as an upper surface of the lock bar, the lock bar is inserted directly beneath the side surface of the lock plate such that swivel of the lock plate can be impeded.

6. The shift lever device according to claim 1, wherein, in the state in which the lever is not positioned at the specified shift position, an upper surface of the lock plate opposes and abuts the lock bar, such that rotation of the cam is retained.

7. The shift lever device according to claim 1, wherein the lock bar is urged by a pressing member and always contacts the cam.

8. The shift lever device according to claim 1, wherein the cam comprises a projecting portion which rotates integrally with the cam.

9. The shift lever device according to claim 8, wherein when the projecting portion opposes the lock plate, swivel of the lock plate is impeded, by pressing the lock bar by the projecting portion.

10. The shift lever device according to claim 1, wherein a connecting portion is provided between the lock body and the side of the lever at which the lock plate is fixed.

11. The shift lever device according to claim 10, wherein the connecting portion includes an insertion hole having an opened surface which opposes the lock plate, and when the lock plate is swiveled, the lock plate is movably accommodated within the insertion hole.

12. The shift lever device according to claim 11, wherein a holding hole, which is allowed to communicate the insertion hole with an interior of the lock body in which the cam is disposed, is formed in the connecting portion.

13. The shift lever device according to claim 12, wherein the lock bar is accommodated and slidably held in the holding hole.

14. A shift lever device which is provided within a vehicle passenger compartment and which is formed integrally with a starting operation portion which starts an engine by a predetermined operation being carried out in a state in which a key member provided in a vehicle is disposed within the vehicle passenger compartment, the shift lever device comprising:

a lever which is provided within the vehicle passenger compartment so as to be freely swiveled for shifting a transmission; and a shift lock mechanism, which does not permit shifting operation of the lever from a specified shift position unless at least the key member is disposed within the vehicle passenger compartment, including a lock plate which swivels as the lever is operated for shifting, and a lock bar operatively connected to said starting operation portion for impeding and allowing swiveling of the lock plate.

15. The shift lever device according to claim 14, wherein the key member is an ignition key, and the starting operation portion is a lock body which accommodates a key cylinder into which the ignition key is inserted.

16. The shift lever device according to claim 15, further comprising a key interlock mechanism which does not permit the ignition key to be pulled out from the key cylinder unless the lever is positioned at the specified shift position.

17. A shift lever device which is provided within a vehicle passenger compartment and which is formed integrally with a lock body which accommodates a key cylinder into which an ignition key is inserted, the shift lever device comprising:

a lever which is provided within the vehicle passenger compartment so as to be freely swiveled for shifting a transmission; and a key interlock mechanism which does not permit the ignition key to be pulled out from the key cylinder unless the lever is positioned at a specified shift position;

a lock plate which is fixed to a proximal end side of the lever and which swivels as the lever is operated for shifting;

a cam which is provided at the key cylinder, and which rotates integrally with rotation of the ignition key, and which opposes the lock plate when the ignition key is positioned at a specified key position; and a lock bar which is provided slidably between the cam and the lock plate in a state of being urged toward the cam.

18. The shift lever device according to claim 17, wherein the key interlock mechanism is a mechanism in which, due to sliding of the lock bar being impeded by the lock plate, rotation of the cam is retained, and pulling-out of the ignition key from the key cylinder is not permitted.

19. The shift lever device according to claim 18, further comprising a shift lock mechanism in which, due to the ignition key being inserted and rotated and moved from the specified key position, the lock bar is slid by the cam toward the lock plate such that swivel of the lock plate is impeded, and shifting operation of the lever from the specified shift position is not permitted.

* * * * *